United States Patent [19]
Stubbs et al.

[11] 3,820,812
[45] June 28, 1974

[54] VEHICLE SUSPENSION SYSTEMS

[75] Inventors: Peter William Robert Stubbs, Hampton Magna; Stephen John Crouch, Coventry, both of England

[73] Assignee: The Rover Company Limited, Warwickshire, England

[22] Filed: July 10, 1972

[21] Appl. No.: 270,322

[30] Foreign Application Priority Data
July 9, 1971   Great Britain.................... 32303/71

[52] U.S. Cl........... 280/104, 280/112 A, 280/124 F
[51] Int. Cl............................................ B60g 21/06
[58] Field of Search............ 280/104, 124 F, 124 R, 280/112 R, 112 A, 6 R, 6 H, 6.1, 6.11

[56] References Cited
UNITED STATES PATENTS

| | | | |
|---|---|---|---|
| 2,330,541 | 9/1943 | Barenyi | 280/112 R |
| 2,650,108 | 8/1953 | Bruce | 267/20 A |
| 2,828,138 | 3/1958 | Brueder | 267/15 A |
| 3,328,019 | 6/1967 | Wilson | 280/6 R |
| 3,598,424 | 8/1971 | Crouch | 280/6 H |
| 3,625,539 | 12/1971 | Crouch | 280/112 R |
| 3,632,131 | 1/1972 | Engfer | 280/124 F |

*Primary Examiner*—Philip Goodman
*Assistant Examiner*—John A. Carroll
*Attorney, Agent, or Firm*—Scrivener, Parker, Scrivener & Clarke

[57] ABSTRACT

In an active anti-roll suspension control system for four-wheeled road vehicles of the kind employing variable-length hydraulic struts acting in series with the front springs and controlled by control units sensitive to lateral bodywork acceleration, the rear suspension is of a different kind, which may be orthodox, and anti-roll is applied at the rear by hydraulic cylinders acting on the rear suspension independently of the rear springs, these cylinders being controlled by the control units for the corresponding front struts. The line of action of the rear cylinders may be such that they are unaffected by normal rear suspension movements, or the cylinders may be double-acting and diagonally cross-connected to avoid being affected.

5 Claims, 1 Drawing Figure

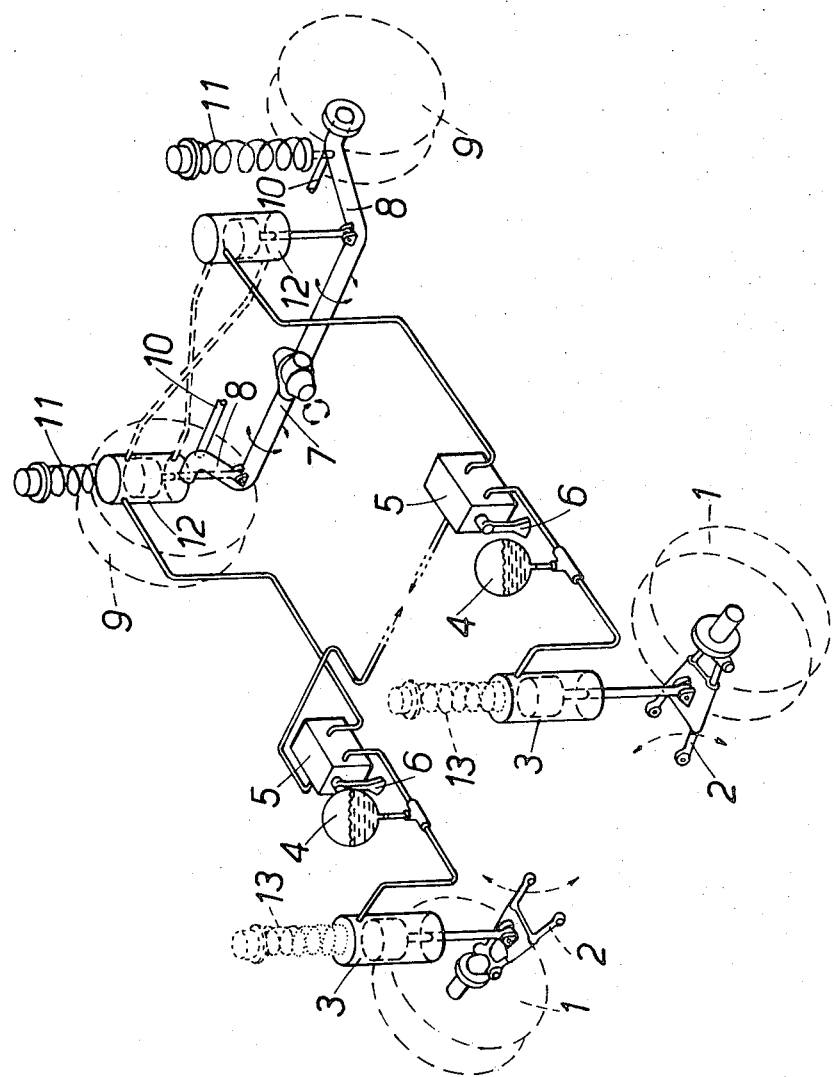

VEHICLE SUSPENSION SYSTEMS

This invention relates to vehicle suspension systems, in particular those employing active anti-roll features in which the forces that cause, or try to cause roll of the vehicle body with respect to the wheels about a longitudinal axis are resisted by forces applied from a source of power and acting through or on the suspension system.

In the specification of our United States letters Patent No. 3,625,539 we have described a layout in which suspension units at each of the wheels include fluid pressure struts and there are control units at each side of the front portion of the vehicle, incorporating means sensitive to lateral acceleration of the bodywork and acting to supply hydraulic fluid under pressure to all the struts on the associated side of the vehicle when the vehicle tends to roll towards that slide. The struts act in series with the normal suspension springs of the suspension system.

A drawback in the layout of U.S. Pat. No. 3,625,539 is the very low pitch stiffness resulting from the interconnection of the front and rear suspension struts on each side through the control unit common to that side. This can lead to the suspension linkage coming into violent contact with its bump stops when the vehicle negotiates a sudden change of gradient.

An aim of the present invention is to allow the application of anti-roll features to a suspension system employing a rear axle layout which is basically of known or orthodox form, for example, one of the kind described in the specification of our British Patent No. 1,155,591. In such a layout a rigid rear axle is offset forwards or to the rear of the axis of the wheels and is allowed to pivot about its own axis to provide the normal suspension movements by the swinging of its trailing or leading end portions about this last-mentioned axis. The suspension springs can be of any convenient form, for example coil springs bearing on the trailing or leading end portions of the axle. In addition the axle has freedom to tilt about a longitudinal axis through its mid-point.

According to the invention there is now proposed a suspension system for a four-wheeled road vehicle comprising hydraulic struts acting on the front wheels in series with spring means, the supply of hydraulic fluid to the strut on each side being controlled by a control unit sensitive to lateral acceleration of the vehicle bodywork and acting to vary the effective length of the strut to counteract tendencies of the bodywork to roll about a longitudinal axis with respect to the wheels under lateral acceleration, the rear wheels being carried on a suspension linkage with springs which are independent of the front suspension and front struts, and two hydraulic cylinders acting respectively on opposite sides of the rear suspension independently of the rear springs and connected to the control units controlling the front struts, so as to act on the rear suspension simultaneously with the action of the front struts to counteract roll.

In one preferred layout the rear suspension linkage comprises a rigid axle having its axis forward of or behind the axis of the rear wheels and having trailing or leading end portions that carry the wheels, the axle being capable of pivoting about its own axis to allow bump and rebound movement of the wheels and being capable also of tilting about an axis substantially at its mid-point extending longitudinally of the vehicle, and the cylinders having their lines of action passing through the axis of this axle.

Thus we have been able to achieve anti-roll control effective on both the front and rear wheels yet without having to have at the rear the relatively complex and expensive hydraulic struts that were used on all four wheels in the layout described in our earlier Patent Specification No. 3,625,539. On the contrary, we are able to use at the rear a suspension of the kind described in our British Patent Specification No. 1,155,591, with all its advantages, and to superimpose the anti-roll control without the anti-roll action and the normal non-rolling suspension movements interfering with one another. Also we overcome the low pitch stiffness associated with directly interconnected front and rear suspension struts.

According to a further feature of the invention the two cylinders which apply the anti-roll control to the rear axle are double-acting and are cross-connected so that in the event of any simultaneous deflections in the same direction they offer no significant resistance.

The invention will now be further described by way of example with reference to the accompanying drawing which is a diagrammatic isometric view of a suspension layout in accordance with the invention.

The spring that takes the suspension loads at each wheel is of a known combined hydraulic and pneumatic layout comprising a hydraulic strut or cylinder 3 in combination with a gas spring in the form of a closed housing 4 (spherical in the example shown) containing a trapped volumn of gas, such as nitrogen, separated from the hydraulic fluid by a diaphragm. Movement of the wheel upwards or downwards in relation to the bodywork as the vehicle passes over an uneven road surface causes hydraulic fluid to be displaced from or to the cylinder 3 to compress the gas in the housing 4 to a greater or lesser extent. As indicated in the drawing, the housing 4 can be at a point remote from the suspension linkage.

There may be a restriction in the pipework connecting the cylinder 3 to the housing 4 to provide a damping effect and eliminate the need for separate dampers in the front suspension.

As described in our earlier Patent Specification 3,625,539 there is, at each side of the vehicle near its front end, a control unit 5 connected to a source of hydraulic fluid under pressure (not shown) and containing a valve under the control of a pdnulum 6. This pendulum is arranged to be insensitive to pitching or vertical movements and so does not interfere with normal bump and rebound movements of the front suspension, but it responds to lateral accelerations which occur when the vehicle negotiates a bend, and then acts to feed hydraulic fluid to the strut on that side of the vehicle which is on the outside of the bend. Correspondingly, the pendulum on the control unit on that side which is on the inside of the bend allows fluid to flow from the associated strut 3. In this way the tendency of the vehicle to roll on bends is counteracted and, as described in our earlier patent specification, may be eliminated completely or even opposed to the extent that the vehicle bodywork banks inwards instead of outwards. The control unit may take the form described in our Patent Specification 3,598,424.

However, in contrast to the earlier arrangement of U.S. Pat. No. 3,625,539 we do not have similar struts at the rear. Instead we have a suspension system of the same general kind as that described in our British Patent Specification No. 1,155,591, comprising a rigid axle 7 having cranked end portions 8 to carry the wheels 9. The axle is pivoted to the vehicle bodywork 5 to swing about its own axis, transverse to the longitudinal axis of the vehicle, to allow the end portions to swing up and down on normal bump and rebound movements of the wheels 9. The wheels are driven through universally jointed shafts 10 from a differential housing (not shown) on the vehicle bodywork. Normal suspension movements are controlled by orthodox means, shown in the example as coil springs 11 bearing on the cranked end portions of the axle.

The rear axle 7 also has some freedom to pivot with respect to the vehicle bodywork about an axis extending approximately through its mid-point and coinciding with the longitudinal axis of the vehicle. A pair of hydraulic cylinders 12 are connected between the bodywork and the ends of the straight portions of the axle 7 so that their lines of action intersect the transverse axis about which the axle pivots on normal bump and rebound movements of the wheels. Thus these cylinders do not interefere with or respond to symmetrical two-wheel bump or rebound suspension movements on a straight road. The top end of each cylinder 12 is connected to the control unit 5 on the associated side so that when the unit admits fluid to, or allows the escape of fluid from, the suspension strut of the front wheel on the same side it has the same action on the hydraulic cylinder of the rear wheel. The dimensions of the cylinders are chosen so that the rolling force applied to the front and rear wheels is distributed in the same ratio as the weight distribution on those wheels.

It will be seen that we have combined a fully anti-roll front suspension with a different form of rear suspension onto which the anti-roll control has been superimposed, without interfering with the normal suspension behaviour, so we have obtained full anti-roll control at both front and rear without losing the advantage of freedom to provide a rear axle of a particular kind having desirable features. Also the pitch stiffness of the overall suspension can be adequate, and can in fact be as high as is desired, in contrast to the system of our earlier Patent Specification 3,625,539.

It is possible to add a self-levelling strut of a known kind to the rear axle if desired, but this will be entirely separate from the anti-roll arrangements (apart from making use of the same source of hydraulic power).

The rear axle need not be of the form shown. This form has advantages in relation to the application of the anti-roll cylindes 12 in that these cylinders are not influenced by normal bump and rebound movement. Where a different form of axle is used, or where independent rear suspension is used, the cylinders 12 can be made double-acting instead of single-acting, and can be cross-connected in a diagonal fashion as indicated in broken lines, with the upper end of each of the two cylinders connected to the lower end of the other. Then, although the attachment point of the cylinders to the axle may move vertically in normal two-wheel bump and rebound travel of the rear suspension, this movement merely causes displacement of fluid, without appreciable reistance. However, if desired, restrictions may be placed in the cross-connections so that the cylinders act as dampers.

At the front it is not essential that the hydraulic fluid should be displaced in normal suspension movements or that the springs should be gas springs. For example the gas springs 4 could be omitted and replaced by helical coil springs mounted on the struts 3, i.e., acting between the strut and the vehicle bodywork, or alternatively interposed between the struts and the suspension linkage. This is shown in broken lines at 13 in the drawing. The only essential thing is that at the front of the vehicle the springs should be in series with the struts, i.e., that the load is transmitted through the hydraulic fluid in the struts to the springs, or through the springs to the struts. The suspension damper (not shown) will work in parallel with the spring in the usual way, but not in parallel with the strut.

In order to improve the overall response of the vehicle as it enters a corner, it may be desirable to apply the anti-roll forces to the rear of the vehicle before they are applied at the front. This can be achieved by inserting damping restrictions in the connections from the control units 5 to the front struts, to delay the flow of fluid to or from those struts until slightly after pressure has built up in the rear cylinders 11.

As in our earlier arrangement the control units 5 may be associated with feed-back linkages that ensure that the pendulum 6 does not respond to irregularities in the road surface. The feed-back linkages employ springs acting in parallel with dampers to give both position feed-back and velocity feed-back. If the springs are given non-linear characteristics it is possible to cause the control units to have a positive action in assisting the main springs 4 to 12 to alter the attitude of the bodywork in relation to the wheel in a pitching sense, i.e., to raise or lower the nose of the vehicle in a controlled manner, when the vehicle encounters a sudden change of gradient, for example at the foot of a ramp or at the top of a ramp; this is separate from the function of the control units in correcting roll.

We claim:

1. In a vehicle having a body and a plurality of wheels arranged in two tracks, s suspension system for counteracting body roll about the longitudinal axis of said vehicle, said suspension system for each track comprising a front suspension linkage supporting a front wheel in said respective track, a front hydraulic strut acting between said body and said front suspension linkage, spring means connected in series to said front hydraulic strut for accommodating relative vertical movements of said body and said front wheel, front conduit means for conducting hydraulic fluid to and from said front hydraulic strut to vary the loading thereof, a control unit mounted on said body connected to said front conduit means, rear conduit means connected to said control unit, a rear hydraulic strut connected to said rear conduit means through which hydraulic fluid is conducted to vary the loading of said rear hydraulic strut, rear suspension means for accommodating relative vertical movements of said body and a rear wheel supported thereon with said rear hydraulic strut acting between said rear suspension means and said body, said control unit including means responsive to horizontal acceleration forces effecting said body roll and said responsive means controlling the flow of hydraulic fluid through said front and rear conduit means to vary the loading on said repective front and rear hydraulic struts to counteract body roll independently of normal vertical suspension movements, and a hydraulic fluid pressure source connected to the control unit of each track.

2. The suspension system according to claim 1 wherein said spring means connected in series to said front hydraulic strut comprises a gas spring connected to said front conduit means.

3. The suspension system according to claim 1 wherein said rear suspension means comprises a rigid axle supporting said rear wheels of each track at opposed ends, and rear spring means acting between said axle and said body.

4. The suspension system according to claim 3 wherein said rigid axle has end portions extending longitudinally of said body with said rear wheels being mounted on the free ends thereof, said body being connected to said axle for pivotal movement about the axle axis and said longitudinal axis of said body, said rear springs acting between said end portions and said body and the axes of said rear hydraulic struts intercepting the said axle axis.

5. The suspension system according to claim 1 wherein said hydraulic struts are each double-acting having lower and upper ends, the lower end of each rear hydraulic strut being connected to the upper end of the opposed rear hydraulic strut by connections permitting cross-flow of hydraulic fluid between said rear hydraulic struts to accommodate said relative vertical movements of said body and said rear wheels.

* * * * *